Figure 1A:
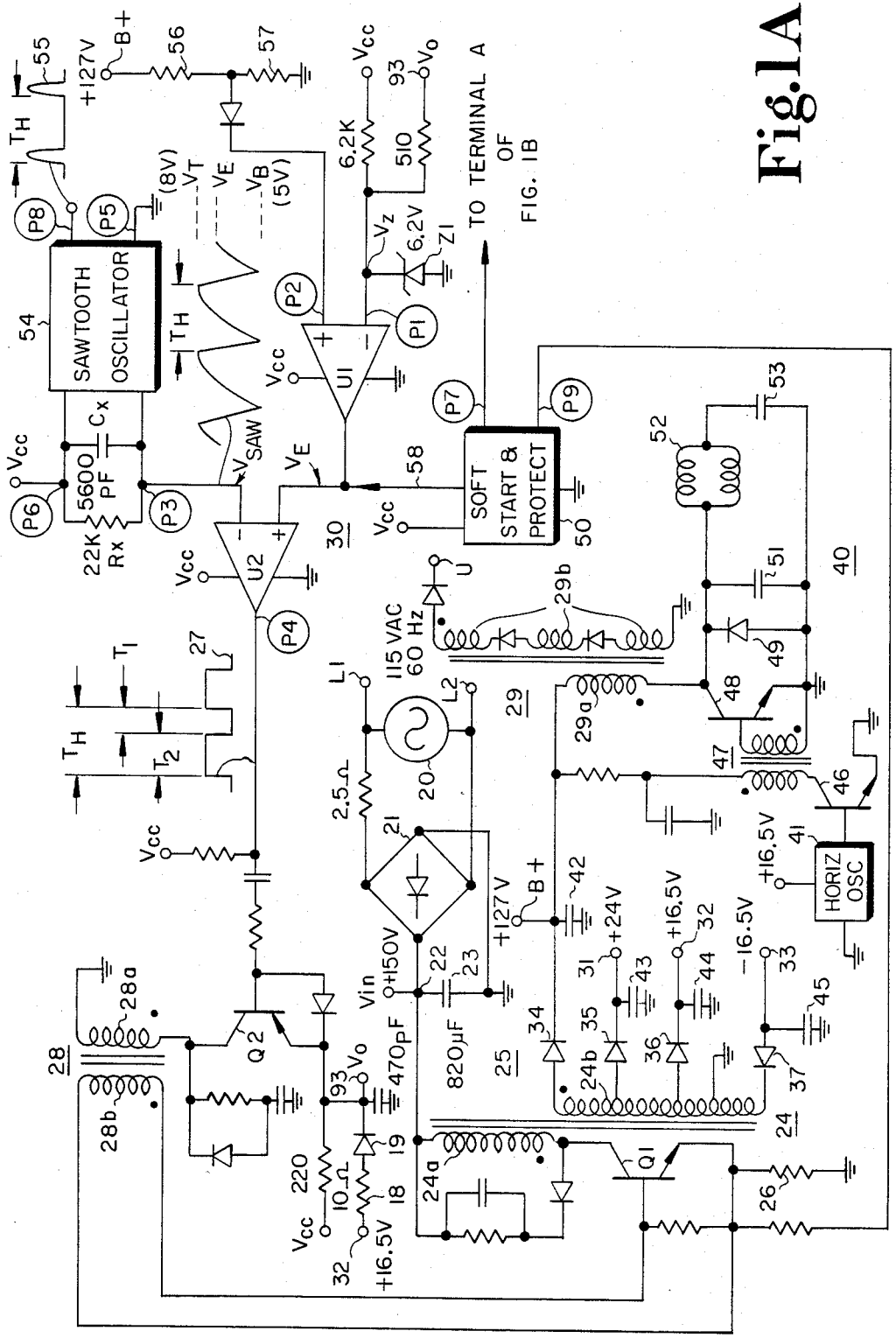

United States Patent [19]

Hicks

[11] Patent Number: 4,516,168

[45] Date of Patent: May 7, 1985

[54] SHUTDOWN CIRCUIT FOR A SWITCHING REGULATOR IN A REMOTE CONTROLLED TELEVISION RECEIVER

[75] Inventor: James E. Hicks, New Palestine, Ind.

[73] Assignee: RCA Corporation, New York, N.Y.

[21] Appl. No.: 445,776

[22] Filed: Nov. 30, 1982

[51] Int. Cl.³ .......................... H04N 5/44; H04N 3/18
[52] U.S. Cl. ..................... 358/190; 358/243; 358/194.1; 361/91; 361/56; 363/21; 363/56
[58] Field of Search ............... 358/190, 194.1, 243; 361/91, 56; 315/411; 363/21, 56, 97

[56] References Cited

U.S. PATENT DOCUMENTS

| | | | |
|---|---|---|---|
| 4,024,577 | 5/1977 | Diethelm | 358/190 |
| 4,234,829 | 11/1980 | Willis | 358/243 |
| 4,240,134 | 12/1980 | Nakzawa et al. | 363/21 |
| 4,253,136 | 2/1981 | Nanko | 363/21 |
| 4,321,513 | 3/1982 | Knight | 358/243 |
| 4,343,028 | 8/1982 | Hicks | 358/190 |
| 4,377,776 | 3/1983 | Luz | 315/411 |
| 4,387,324 | 6/1983 | Willis | 358/190 |
| 4,435,731 | 3/1984 | Kliebphipat et al. | 358/190 |

OTHER PUBLICATIONS

Technical Information Report No. 006, Switching Regulator Control IC (AN5900), Semiconductor Division Matsushita Electronics Corporation.

*Primary Examiner*—Tommy P. Chin
*Assistant Examiner*—Michael D. Parker
*Attorney, Agent, or Firm*—Eugene M. Whitacre; Paul J. Rasmussen; Joseph J. Laks

[57] ABSTRACT

In a switching regulator power supply, the primary winding of a switching transformer is coupled to a source of input voltage and to a power switch. Secondary supply voltages for a load circuit such as a television receiver are obtained from a secondary winding of the transformer. A regulator control circuit develops a pulse width modulated signal that is used to control the duty-cycle of the power switch for regulating the supply voltages. A disabling circuit is coupled to the regulator control circuit and is responsive to a low bias voltage at a disabling control terminal to change the duty cycle of the power switch in a manner that disables the normal transfer of energy to the load circuit. A disabling input terminal is coupled to an input terminal of a comparator and to the disabling control terminal. The comparator output is coupled to a disabling switch having an output coupled to the disabling control terminal. A first signal generator is responsive to a first condition requiring the disabling of the power supply and develops at the disabling input terminal a first bias voltage that is low enough to, in turn, bias low the disabling control terminal to initiate the disabling of the power supply. A second signal generator is responsive to a second condition requiring the disabling of the power supply and develops a second bias voltage that is higher than the first bias voltage and is high enough to activate the comparator. When the comparator is activated, the disabling switch turns on to bias low the disabling control terminal to initiate the disabling of the power supply.

8 Claims, 2 Drawing Figures

SHUTDOWN CIRCUIT FOR A SWITCHING REGULATOR IN A REMOTE CONTROLLED TELEVISION RECEIVER

This invention relates to a shutdown circuit for a switching regulator in a remote controlled television receiver.

Switching regulators serve as efficient and compact power supplies for instruments such as television receivers. A switching regulator may typically comprise a power transformer having a primary winding coupled to an input voltage source and to a power switch and a secondary winding coupled to a rectifier arrangement for developing a DC supply voltage for the instrument. A regulator control circuit generates pulse width modulated control signals that control the duty cycle of the power switch.

To protect the power switch, the regulator control circuit may include various shutdown circuits that sense overload and overvoltage conditions and disable generation of the switching signal to turn off the power switch in a safe manner. The shutdown circuitry of the regulator may also be used to protect the instrument against damage under abnormal operating conditions of the instrument. In a television receiver with a switching power supply, for example, excessive ultor voltage may be sensed and a shutdown signal sent to the switching regulator control circuit to disable the power supply. To ensure that the power supply be maintained in a shutdown mode, the shutdown signal developing circuitry may include a latch or SCR that is energized during a fault condition.

A feature of the invention is a regulator control circuit with shutdown capability that requires no additional latching components external to the regulator control circuit to properly perform a shutdown operation. Such an arrangement provides an economy of components and eliminates the use of a relatively sensitive three-terminal semiconductor element with properties that have to be critically defined.

A power switch is coupled to an inductance and a source of input voltage. A control circuit is coupled to the power switch for producing the switching thereof to transfer energy from the input voltage source to a load circuit coupled to the inductance. The control circuit is responsive to control voltages for varying the duty cycle of the power switch to control the transfer of energy to the load. A first control voltage representative of a variation in an energy level of the load circuit is developed to control the duty cycle in a manner that regulates the energy level.

A disabling circuit is coupled to the regulator control circuit and is responsive to the voltage at a disabling control terminal for developing a second control voltage that changes the duty cycle in a manner that disables the normal transfer of energy to the load circuit. The second control voltage is developed when the voltage at the disabling control terminal exceeds a given value. A disabling switch coupled to the disabling control terminal changes states upon the activation of a comparator to place the voltage at the disabling control terminal beyond the aforementioned given value to generate the disabling control voltage. An input terminal to the disabling circuit is coupled to the disabling control terminal and to an input terminal of the comparator.

A first shutdown circuit senses a first shutdown condition of the power supply or load circuit energized thereby and biases the voltage at the input terminal to the disabling circuit in a first direction so as to enable the voltage at the disabling control terminal to go beyond the given value to disable the power supply. A second shutdown circuit senses a second shutdown condition and biases the input terminal to the disabling circuit in the opposite direction of the biasing produced by the first shutdown circuit to activate the comparator. When the comparator becomes activated, the disabling switch changes state to enable the voltage at the disabling control terminal to go beyond the given value to disable the power supply.

In such a manner, a single input terminal to the disabling circuit of the regulator control circuit may be utilized by two different shutdown circuits that produce different biases at the input terminal.

Figure 1B:
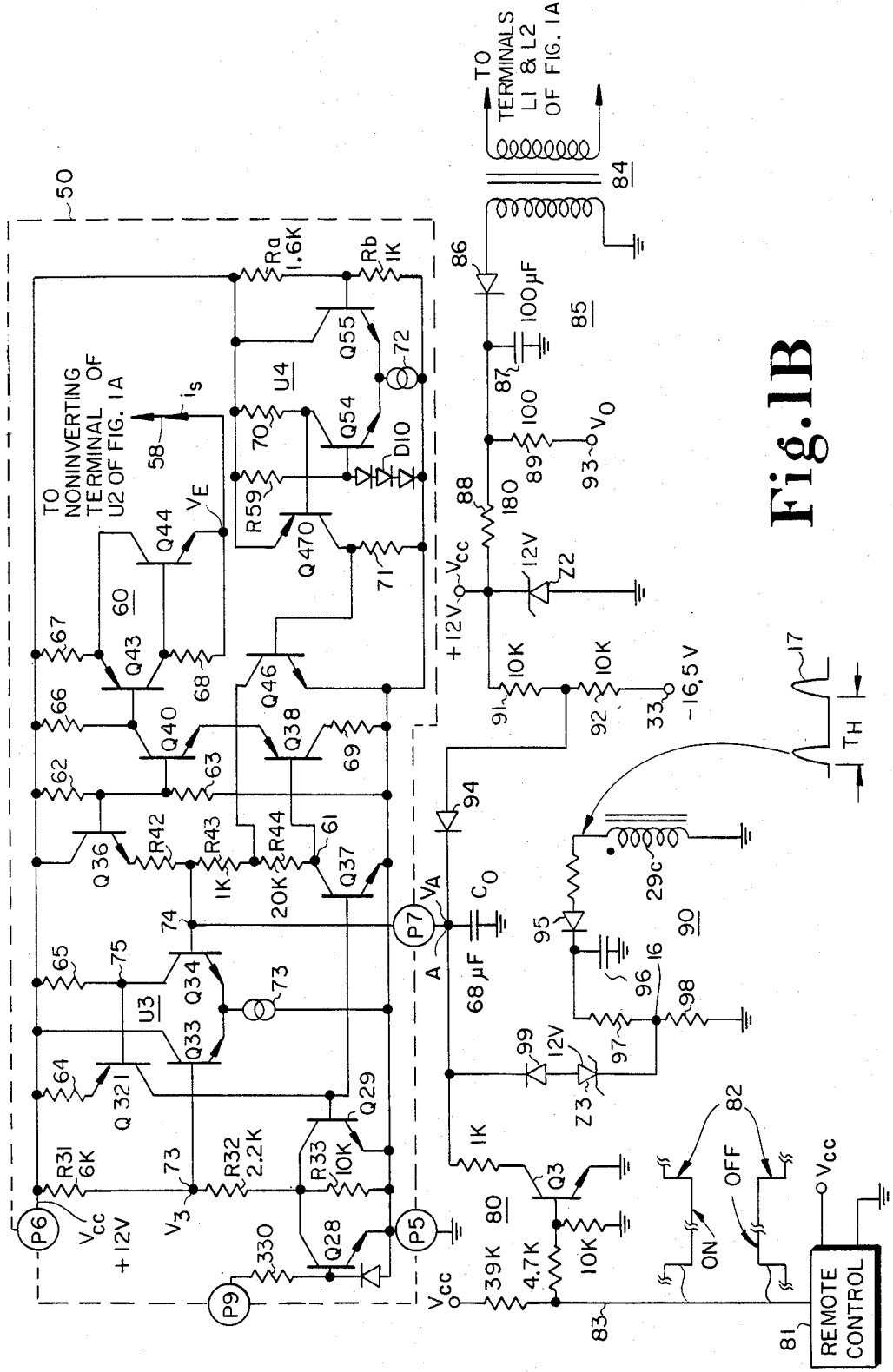

FIG. 1A illustrates a switching regulator power supply and a horizontal deflection circuit of a remote controlled television receiver; and FIG. 1B illustrates the remote controlled startup and protective shutdown circuitry for the switching regulator of FIG. 1A.

In FIG. 1A, a source 20 develops an AC mains supply voltage between terminals L1 and L2. Mains voltage source 20 is coupled to the input terminals of a full wave bridge rectifier 21 to develop at a terminal 22 an unregulated DC input voltage $V_{in}$ that is filtered by a capacitor 23 coupled between terminal 22 and ground.

The unregulated input voltage $V_{in}$ is applied to an inductance, the primary winding 24a of a power transformer 24 of a switching regulator power supply 25. The collector of a controllable switch, transistor Q1, is coupled to primary winding 24a and the emitter is coupled to ground through a current sensing resistor 26. A regulator control circuit 30 develops a pulse width modulated switching signal 27 at an output terminal P4 that is used to control the switching of output transistor Q1 to transfer energy from supply terminal 22 to the various load circuits coupled to the secondary DC supply terminals of power supply 25 such as supply terminals 31-33 and the B+ supply terminal.

Switching signal 27 is applied to the base of a driver transistor Q2. When switching signal 27 is in the low state during the interval T1 of waveform 27, driver transistor Q2 is conducting to make positive the dotted terminal of primary winding 28a of a coupling transformer 28. A forward drive voltage for output transistor Q1 is therefore developed across secondary winding 28b during the interval T1.

Output transistor Q1 and power transformer 24 are operated in the flyback converter mode. When transistor Q1 is conducting, the DC input voltage $V_{in}$ is developed between the two terminals of primary windings 24a, with the dotted terminal of the winding being negative relative to the undotted terminal. The dotted terminal of secondary winding 24b is therefore negative relative to its undotted terminal at the cathode of diode 37, thereby reverse biasing the secondary supply rectifiers 34–37.

During the interval T2 of switching signal 27, driver transistor Q2 is cut off, cutting off conduction in output transistor Q1. The dotted terminal of secondary winding 24b becomes positive, forward biasing secondary supply rectifiers 34–37 to charge filter capacitors 42–45, thereby developing DC supply voltages at supply terminals 31–33 and the B+ supply terminal.

The DC supply voltages developed by switching power supply 25 energizes various load circuits within the television receiver. The +24 V supply voltage developed at terminal 31 energizes such load circuits as the signal processing circuits. The +16.5 V supply voltage developed at terminal 32 energizes such circuits as the horizontal oscillator. The −16.5 V supply voltage developed at terminal 33 energizes such circuitry as the automatic picture tube biasing circuitry.

The B+ voltage developed at the B+ supply terminal energize a horizontal deflection circuit 40. Horizontal deflection circuit 40 comprises horizontal oscillator 41, a horizontal driver transistor 46, a horizontal driver transformer 47, and a horizontal output stage comprising a horizontal output transistor 48, a damper diode 49, a retrace capacitor 51, and a horizontal deflection winding 52 coupled to an S-shaping capacitor 53. When energized by the B+ voltage, horizontal deflection circuit 40 also functions as a low and high voltage generator to generate a horizontal retrace pulse voltage that is applied to a primary winding 29a of a horizontal output transformer 29 to develop retrace pulse voltages across low voltage secondary windings, not illustrated in FIG. 1A, and across a high voltage winding 29b. The retrace pulse voltage developed across high voltage winding 29b is rectified to develop an ultor accelerating potential at a terminal U for the picture tube of the television receiver.

To regulate the B+ supply voltage as well as the other secondary supply voltages of switching power supply 25, thereby regulating the ultor accelerating potential, the switching duty cycle of power transistor Q1 is controlled by pulse width modulated switching signal 27. Increasing the on-time of power transistor Q1 tends to increase the secondary supply voltages of power supply 25.

The duty cycle of transistor Q1 and of switching signal 27 may be defined as the fraction $T1/T_H$ where $T_H$ is the duration of one cycle of the switching signal 27. To regulate against a decrease in the secondary supply voltages, such as a decrease in the B+ voltage caused by a decrease in the unregulated input voltage $V_{in}$ or caused by an increase in current loading on ultor terminal U, regulator control circuit 30 increases the duty cycle of switching signal 27 by increasing the duration of the interval T1 relative to the interval T2. Increasing the interval T1 increases the on-time of power switch Q1 thereby opposing the tendency of the B+ supply voltage to decrease.

Regulator control circuit 30 may be similar to that of the switching regulator control IC AN5900 manufactured by the Semiconductor Division of Matsushita Electronics Corporation, Tokyo, Japan. In the regulator control circuit 30 of FIG. 1A, a sawtooth oscillator 54 develops a sawtooth voltage $V_{saw}$ at an output terminal P3. The energizing potential for sawtooth oscillator 54 is obtained from a $V_{cc}$ terminal P6, and the ground connection for oscillator 54 is at a terminal P5. The free-running frequency of sawtooth oscillator 54 is determined by the time constant associated with a capacitor $C_x$ and a resistor $R_x$. However, during normal steady-state operation of the television receiver, sawtooth oscillator 54 is synchronized with horizontal deflection by applying a retrace pulse voltage 55 to a terminal P8 of the oscillator. During synchronized operation the frequency of the sawtooth voltage $V_{saw}$ is therefore $1/T_H$, where $T_H$ is one horizontal deflection period.

Regulator control circuit 30 includes a comparator U1 that develops an error voltage $V_E$ in response to variations in an energy level of the television receiver to be regulated. In FIG. 1A, the energy level to be regulated is the B+ supply voltage. The B+ voltage is applied to the non-inverting terminal P2 of comparator U1 through a resistor 56 of voltage dividing resistors 56 and 57. A reference voltage $V_z$, developed by a Zener diode Z1 is applied to the inverting input terminal P1 of comparator U1.

The sawtooth voltage $V_{saw}$ is applied to an inverting terminal of a comparator U2 and the error voltage, or slice level voltage $V_E$, is applied to a non-inverting terminal of comparator U2. Comparator U2 compares the voltage $V_{saw}$ with the slice level voltage $V_E$ to produce the switching signal 27. During the interval T1 the voltage $V_{saw}$ is above the slice level $V_E$, making the output of comparator U2 at terminal P4 low. During the interval T2 the voltage $V_{saw}$ is below the slice level $V_E$ making the output of comparator U2 high. The duty cycle of switching signal 27 is changed by operation of comparator U1 which varies the slice level $V_E$. When the B+ voltage tends to increase, the slice level $V_E$ increases, decreasing the duration of the interval T1 relative to the interval T2, thereby decreasing the duty cycle of power switch Q1 so as to oppose the decrease in the B+ voltage.

In addition to being controlled by comparator U1, the slice level $V_E$ is also controlled by a shutdown circuit 50. Shutdown circuit 50 may be similar to that contained in the corresponding portion of the aforementioned AN5900 switching regulator control IC. To protect against an overload or short circuit condition in switching power supply 25, the current flowing in power transistor Q1 is sensed by resistor 26 to develop a voltage thereacross that is applied to an overload sense terminal P9 of shutdown circuit 50. An output line 58 of shutdown circuit 50 is coupled to the output of comparator U1. When an overload condition is sensed at terminal P9, shutdown circuit 50 increases the slice level $V_E$ substantially at or above the upper voltage level $V_T$ of the sawtooth voltage $V_{saw}$. The duty cycle of switching signal 27 is drastically decreased, even to a zero percent duty cycle. In other words under an overload condition output terminal P4 of comparator U2 remains in the high state, reverse biasing transistor Q2 to cut off conduction in transistor Q1.

FIG. 1B illustrates startup and shutdown circuitry for the remote controlled television receiver using the power supply 25 of FIG. 1A and further illustrates a specific embodiment of shutdown circuit 50. In FIG. 1B, a controllable current source 60 generates an additional current $i_s$ along disabling control line 58 to increase the slice level voltage $V_E$ to the level necessary for disabling the generation of switching signal 27 of FIG. 1A.

The conduction of current source 60 is controlled by the voltage developed at a disabling control terminal 61. Terminal 61 is coupled to the base of a PNP transistor Q38, whose conduction controls conduction of current source 60. When the voltage at the terminal 61 is one $V_{be}$ less than the emitter voltage of transistor Q38, whose value is established by voltage dividing resistors 62 and 63, transistor Q38 conducts to turn on current source 60. The more conductive transistor Q38 becomes, the greater the current $i_s$, the greater the slice level $V_E$ and the shorter the duty cycle of switching signal 27.

The voltage at disabling control terminal 61 is controlled in several different ways. A switching transistor Q37 may be turned on to directly bring the voltage at terminal 61 to ground potential thereby turning on transistor Q38. A switching transistor Q46 may be turned on to provide a path to ground for base current in transistor Q38 through a resistor R44, thereby turning on transistor Q38. Also, should the voltage $V_A$ developed at a terminal A and applied to disabling control terminal 61 through terminal P7 and resistors R43 and R44 decrease below about 4.5 volts, transistor Q38 becomes forward biased into full conduction to fully turn on current source 60.

Any one of the aforedescribed mechanisms may be used to disable or shut down operation of switching power supply 25 of FIG. 1A and operation of the remote controlled television receiver energized by the power supply. For example, under an overload condition, the voltage at terminal P9 increases sufficiently to turn on a switching transistor Q28. Resistor R33 of a voltage divider comprising resistors R31-R33 is bypassed. The trigger voltage $V_3$ developed at an input terminal 73 of a comparator U3 switches to a lower trigger level, as determined only by resistors R31 and R32 of the voltage divider R31-R33. Prior to the turning on of transistor Q28, the voltage $V_3$ was at its upper trigger level, as established by the unbypassed voltage divider string of resistors R31-R33. The voltage at a second input terminal 74 of comparator U3 is maintained at the voltage $V_A$ developed at terminal P7 by the direct connection of terminal 74 to the terminal P7. The voltage $V_A$ is filtered by a capacitor $C_0$ coupled to terminal P7. Under normal steady-state power supply operation, the voltage $V_A$ is at a level intermediate to the two trigger levels of the trigger voltage $V_3$. The level of this intermediate voltage is established by voltage dividing resistors 62 and 63.

When an overload condition occurs and transistor Q28 turns on, the voltage $V_3$ switches to its lower trigger level resulting in input terminal 74 being biased at a greater voltage than that now being developed at input terminal 73. Comparator U3 is activated when transistor Q34 of the differential pair of transistors Q33 and Q34 is turned on. When comparator U3 is activated and output terminal 75 of the comparator goes low a transistor Q321 is turned on. The collector of transistor Q321 is coupled to the base of disabling switching transistor Q37. When Q321 turns on, Q37 turns on, turning on transistor Q38 and current source 60. The slice level voltage $V_E$ increases rapidly to disable the generation of the switching signal 27 of FIG. 1A, to shut down power supply 25 in response to the overload condition.

The collector of transistor Q321 is also coupled to the base of a transistor Q29 that parallels transistor Q28. Transistor Q321, when activated by comparator U3, turns on transistor Q29 to maintain the trigger voltage $V_3$ at its lower trigger level as long as comparator U3 is activated.

Comparator U3 remains activated as long as the voltage at input terminal 74 exceeds the lower trigger level of the voltage $V_3$. After shutdown is initiated, the voltage $V_A$ at terminal P7 begins to decrease, as capacitor $C_0$ begins to discharge. The discharge path of capacitor $C_0$ is through the resistors R43 and R44 and the conducting transistor Q37.

Capacitor $C_0$ begins to discharge from its steady-state value of illustratively 5.8 V. As capacitor $C_0$ discharges, the voltage at disabling control terminal 61 begins to decrease, forward biasing transistor Q38 into conduction. Current source 60 begins conducting. The slice level voltage $V_E$ begins to increase, causing the duty cycle of switching signal 27 and power switch Q1 to decrease. The more capacitor $C_0$ discharges, the shorter the duty cycle becomes. When the voltage $V_A$ has decreased to illustratively 4.5 V, the duty-cycle is zero and terminal P4 of FIG. 1A is maintained in the high state.

When capacitor $C_0$ has discharged sufficiently to bring the voltage $V_A$ below the lower trigger level of the voltage $V_3$, below illustratively 3.2 V, transistor Q34 turns off and transistor Q33 turns on, deactivating comparator U3 and turning off transistors Q321, Q29 and Q37. This assumes that the overload condition has not persisted and that transistor Q28 is nonconductive.

With transistor Q37 turned off by deactivation of comparator U3, the discharge path of capacitor $C_0$ is removed, and capacitor $C_0$ begins to charge from the $V_{cc}$ terminal through transistor Q36 and resistor R42. As the capacitor $C_0$ charges through transistor Q36, the voltage $V_A$ at terminal P7 increases. When the voltage $V_A$ increases to approximately 4.5 V, the forward bias on transistor Q38 begins to decrease sufficiently to reduce conduction of the transistor. The conduction of current source 60 is accordingly reduced. The slice voltage level $V_E$ begins to decrease, permitting the duty cycle of switching signal 27 to increase and permitting power transistor Q1 to be conductive for longer intervals within each switching cycle.

At the steady state value of 5.8 V for the voltage $V_A$, the slice voltage $V_E$ assumes its steady state value as does the duty cycle of switching signal 27. During steady state operation, with comparator U3 deactivated, the trigger voltage $V_3$ assumes its upper trigger voltage level of illustratively 7.4 V, a level greater than the steady state voltage of 5.8 V assumed by the voltage $V_A$.

As mentioned previously the shutdown sequence may be initiated by means of the conduction of transistor Q46. A fault operating condition that activates transistor Q46 is illustratively that of too low a supply voltage $V_{cc}$. The voltage $V_{cc}$ is coupled to an input terminal of a comparator U4 at the base of a transistor Q55, through a resistor $R_a$ of a voltage divider comprising resistors $R_a$ and $R_b$. A reference voltage developed by a string of diodes D10 is developed at the other input terminal of comparator U4, at the base of a transistor Q54. When the supply voltage $V_{cc}$ decreases excessively; illustratively below 5.4 V, comparator U4 is activated by the conduction of transistor Q54, to turn on a transistor Q470.

Transistor Q470 is coupled to the base of disabling switching transistor Q46. When transistor Q470 is turned on, coupling terminal P7 to ground through resistor R43 and transistor Q46, capacitor $C_0$ begins to discharge initiating the aforedescribed shutdown sequence.

An overvoltage shutdown capability to disable switching power supply 25 when the supply voltage $V_{cc}$ becomes excessively large may be provided in a manner similar to the just described undervoltage shutdown capability. Another comparator, similar to the comparator U4, but not illustrated in FIG. 1B, may compare the $V_{cc}$ supply voltage with a reference voltage and become activated when the supply voltage $V_{cc}$ becomes too great. The activation of this comparator turns on transistor Q46 to initiate shutdown.

In accordance with an aspect of the invention, disabling input terminal P7 of shutdown circuit 50 is connected to two different signaling circuits. Each circuit operates in a different manner, to generate the disabling control voltage at terminal 61 that is needed to turn on transistor Q38 and current source 60 to raise the slice level voltage $V_E$ to the level required to disable the generation of switching signal 27.

The first signal generator is a remote control, on/off circuit 80. A remote control receiver 81 generates the on-state of a remote control on/off command signal 82 during the run mode of operation of the television receiver. The signal is coupled along a signal line 83 to the base of a standby switching transistor Q3, maintaining the transistor in the cutoff condition.

To place the television receiver in the standby mode of operation, the off-state of command signal 82 is generated on signal line 83 to turn on standby switching transistor Q3. Transistor Q3 is coupled to input terminal P7 of shutdown circuit 50. When the transistor conducts, capacitor $C_0$ discharges to maintain the voltage $V_A$ near ground potential. The voltage at disabling control terminal 61 is low enough to turn on transistor Q38 and current source 60 to increase the slice voltage level $V_E$ to a level that will disable the generation of switching signal 27.

Power supply 25 shuts down, removing the secondary supply voltages at terminals 31–33 and at the B+ terminal. Horizontal deflection circuit 40 and the other load circuits of the television receiver energized by power supply 25 revert to standby status.

During standby, supply voltage for remote control signal generator 80 is obtained from the $V_{cc}$ terminal. The $V_{cc}$ voltage is developed during standby by a standby power supply 85. Standby power supply 85 includes a mains transformer 84 having a primary winding coupled to terminals L1 and L2 of mains voltage source 20 of FIG. 1A and a secondary winding coupled to a half-wave rectifier 86. The main supply voltage is coupled through transformer 84 and half-wave rectified by diode 86 to develop a DC voltage across a capacitor 87 that is available during both states of the on/off command signal 82. The DC voltage is applied through a resistor 88 to the $V_{cc}$ terminal. A Zener diode Z2 is coupled to the $V_{cc}$ terminal to maintain the terminal at the Zener voltage of, illustratively, 12 volts. The $V_{cc}$ supply, in addition to providing a standby supply for remote control on/off signal generator 80, provides a startup voltage to those circuit elements needing one during the startup interval occurring immediately after the development of the on-state of command signal 82.

When the on-state of command signal 82 is generated, transistor Q3 becomes cut off, enabling capacitor $C_0$ to begin charging thru terminal P7 and transistor Q36. An additional charging path for capacitor $C_0$ is provided from the $V_{cc}$ terminal through a resistor 91 and a diode 94. This second charging path is incidental to the normal charging path through resistor Q36 but is required for purposes to be explained later. When the voltage $V_A$ has increased sufficiently to turn off transistor Q38 and current source 60, normal switching signals are developed by regulator control circuit 30 of FIG. 1A to initiate the switching of driver transistor Q2 and power switch Q1.

During the startup interval, collector supply current for driver transistor Q2 is obtained from the $V_{cc}$ terminal. Supply current for the collector of transistor Q1 is obtained from the unregulated input voltage terminal 22. The unregulated input voltage $V_{in}$ is developed during both states on the on/off command signal to enable current to be supplied to transistor Q1 during the startup interval.

Once switching of transistor of Q1 has commenced and secondary supply voltages have been developed at terminals 31–33 and the B+ terminal, the majority of the current flowing from the $V_{cc}$ terminal of FIG. 1B is derived from the +16.5 V supply terminal 32 of FIG. 1A through a resistor 18 and a diode 19 to a $V_0$ supply terminal 93. The $V_0$ supply terminal 93, after the startup interval has elapsed, takes over the supply of current to such load circuits as the collector circuit of driver transistor Q2 and all the load circuits coupled to the $V_{cc}$ supply terminal.

In accordance with another aspect of the invention, the same terminal, disabling input terminal P7, is used by a second signal generator 90 to disable normal power supply and television receiver operation. However, instead of bringing the voltage at terminal P7 down to near ground potential to initiate disabling, shutdown signal generator 90, when energized, brings the voltage at terminal P7 up to a level which is greater than the upper trigger level of the trigger voltage V3 of comparator U3. When the voltage at terminal P7 is brought up above the upper trigger level of the voltage V3, transistor Q34 turns on, activating comparator U3 to turn on transistors Q321, Q29 and Q37. With disabling switch Q37 conducting, disabling control terminal 61 is connected to ground, turning on transistor Q38 to initiate the shutdown sequence for power supply 25.

Shutdown signal generator 90 comprises a high voltage protection circuit that senses excessive ultor voltage at terminal U and shuts down power supply 25 as a consequence. High voltage protection circuit 90 comprises a secondary winding 29c of horizontal output transformer 29 of FIG. 1A, a diode 95 to rectify the retrace pulse voltage 17 developed across winding 29c, and a filter capacitor 96 to develop a DC voltage having a value that is representative of the ultor accelerating potential at terminal U. A voltage divider comprising resistors 97 and 98 is coupled across capacitor 96. The junction terminal of resistors 97 and 98 is coupled to terminal A through a Zener diode Z3 and a diode 99.

When the ultor voltage becomes excessive, as indicated by an increased amplitude to the retrace pulse voltage 17, the voltage at junction terminal 16 is sufficiently large to break down Zener diode Z3 to begin the charging of capacitor $C_0$. When the voltage $V_A$ increases above the upper trigger threshold voltage level of the trigger voltage V3, due to the increased voltage at junction terminal 16, comparator U3 is activated to disable the generation of switching signal 27, thereby shutting down operation of power supply 25 and operation of horizontal deflection circuit 40 to disable the generation of excessive ultor voltage.

With switching power supply 25 shutdown, the −16.5 V supply voltage at terminal 33 is removed. Because of this, the reverse biasing voltage for diode 94 that was applied to the anode of the diode from the −16.5 V supply terminal 33 through a resistor 92, is now removed. Diode 94 becomes forward biased by the standby supply voltage being developed at terminal $V_{cc}$ and maintains the voltage $V_A$ at terminal P7, at the input of comparator U3, at a voltage greater than the lower trigger level of the trigger voltage V3 that is now being developed at terminal 73. Comparator U3 remains activated after high voltage shutdown has been initiated and prevents switching power supply 25 from restarting.

To restart switching power supply 25, the voltage $V_A$ is brought down below the lower trigger voltage level of the voltage V3 to enable transistor Q33 to turn on and transistor Q34 to turn off to deactivate comparator U3. The restart sequence is initiated when remote control circuit 81 develops the off-state of command signal 82 to turn on remote control transistor Q3. With transistor Q3 conducting, the current from standby current power supply 85 that flows through diode 94 is shunted from capacitor $C_0$ to ground through transistor Q3. Capacitor $C_0$ discharges through transistor Q3. When the voltage $V_A$ has decreased to below the lower trigger level of the trigger voltage V3 and comparator U3 has been deactivated, transistor Q37 is switched off, enabling the restart sequence of power supply 25 to begin. When normal operation of regulator control circuit 30 and normal switching of transistor Q1 has resumed and the $-16.5$ V supply voltage at terminal 33 becomes developed, diode 94 becomes reverse biased, disconnecting standby supply 85 from terminal P7.

What is claimed is:

1. A switching power supply with disabling circuitry, comprising:
   a source of input voltage;
   a power supply inductance coupled to said input voltage source;
   a load circuit coupled to said inductance;
   a power switch coupled to said inductance;
   a regulator control circuit coupled to said power switch for producing the switching thereof to transfer energy from said input voltage source to said load circuit, said regulator control circuit being responsive to control voltages for varying the switching duty-cycle of said power switch to control the transfer of energy to said load circuit;
   means for developing a first one of said control voltages representative of variations in an energy level of said load circuit to control said duty-cycle in a manner that regulates said energy level;
   a disabling circuit coupled to said regulator control circuit and responsive to the voltage at a disabling control terminal for developing a second one of said control voltages that changes said duty-cycle in a manner that disables the normal transfer of energy to said load circuit, said second one control voltage being generated when the disabling control terminal is biased to a voltage that is beyond a given value;
   a disabling switch coupled to said disabling control terminal;
   a comparator coupled to said disabling switch;
   a disabling input terminal coupled to an input terminal of said comparator and to said disabling control terminal;
   a first signal generator responsive to a first condition requiring the disablement of said power supply for developing at said disabling input terminal a first bias voltage that exceeds a first value in a first direction in order to bias said disabling control terminal to a voltage that is beyond said given value; and
   a second signal generator responsive to a second condition requiring the disablement of said power supply for developing at said disabling input terminal a second bias voltage that exceeds a second value in the direction opposite that of said first direction in order to bias the input terminal of said comparator beyond a first trigger level voltage in a first direction to activate said comparator, said disabling switch changing conductive states when said comparator is activated for biasing said disabling control terminal to a voltage that is beyond said given value.

2. A switching power supply according to claim 1 wherein activation of said comparator results in the development of a second trigger level such that said comparator becomes deactivated when the input terminal of said comparator is biased beyond said second trigger level voltage in a direction opposite the direction required to activate the comparator.

3. A switching power supply according to claim 2 including means for normally biasing said disabling input terminal to a normal voltage level that does not permit the development by said disabling circuit of said second one control voltage and a capacitor coupled to said disabling input terminal and charged to said normal voltage level by said normally biased means, said capacitor delaying the return of the voltage at said disabling input terminal to said normal voltage level after one of said first and second signal generators ceases to develop its bias voltage.

4. A television receiver that includes the switching power supply of claim 1 and a high voltage generator for developing an ultor accelerating potential, wherein said first signal generator comprises means for developing a signal representative of said ultor accelerating potential and means responsive to said ultor accelerating potential representative signal for developing said first bias voltage when said ultor accelerating potential becomes excessive.

5. A television receiver that includes the switching power supply of claim 1 and a control circuit for generating an on/off command signal, wherein said first signal generator comprises means responsive to said command signal for developing said first bias voltage in response to the development of the off-state of said command signal.

6. A television receiver according to claim 5 including a high voltage generator for developing an ultor accelerating potential, wherein said second signal generator comprises means for developing a signal representative of said ultor accelerating potential and means responsive to said ultor accelerating potential representative signal for developing said second bias voltage when said ultor accelerating potential becomes excessive.

7. A television receiver according to claim 6 including a source of standby voltage available during both states of said on/off command signal and means for applying said standby voltage to said disabling input terminal to bias said disabling input terminal after said second signal generator ceases to develop its bias voltage so as to result in said disabling control terminal being biased to a voltage that is beyond said given value.

8. A television receiver according to claim 7 wherein said switching power supply develops at a regulator supply terminal during normal operation a supply voltage that is removed when said second one control voltage is developed and wherein said standby voltage applying means comprises a diode coupled to said disabling input terminal, to said standby voltage source and to said rectangular supply terminal, said voltage during normal operation causing said diode to be reverse biased, the removal of said supply voltage causing said diode to become forward biased to apply said standby voltage to said disabling input terminal.

* * * * *